US008583658B2

(12) United States Patent
Wilcox et al.

(10) Patent No.: US 8,583,658 B2
(45) Date of Patent: Nov. 12, 2013

(54) CREATING AND MANAGING REFERENCE ELEMENTS OF DEPLOYABLE WEB ARCHIVE FILES

(75) Inventors: Lauren Gabriellle Wilcox, New York, NY (US); Marshall Allen Lamb, Raleigh, NC (US); Christina Karen Lauridsen, Austin, TX (US); Malcolm Casey Ong, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 165 days.

(21) Appl. No.: 13/166,394

(22) Filed: Jun. 22, 2011

(65) Prior Publication Data
US 2011/0271171 A1    Nov. 3, 2011

Related U.S. Application Data

(62) Division of application No. 12/174,420, filed on Jul. 16, 2008, now abandoned.

(51) Int. Cl.
G06F 17/30    (2006.01)

(52) U.S. Cl.
USPC .......................................... 707/748

(58) Field of Classification Search
None
See application file for complete search history.

(56) References Cited

U.S. PATENT DOCUMENTS

| | | | |
|---|---|---|---|
| 5,995,106 A | 11/1999 | Naughton et al. |
| 6,208,995 B1 | 3/2001 | Himmel et al. |
| 6,411,996 B1 | 6/2002 | Albers |
| 6,643,641 B1 | 11/2003 | Snyder |
| 6,725,227 B1 | 4/2004 | Li |
| 6,931,416 B2 | 8/2005 | Kelley et al. |
| 6,941,339 B1 | 9/2005 | McMichael |
| 6,959,319 B1 | 10/2005 | Huang et al. |
| 7,003,735 B2 | 2/2006 | Edlund et al. |
| 7,062,511 B1 | 6/2006 | Poulsen |
| 7,076,463 B1 | 7/2006 | Boies et al. |
| 7,096,219 B1 | 8/2006 | Karch |
| 7,139,978 B2 | 11/2006 | Rojewski et al. |
| 7,178,096 B2 | 2/2007 | Rangan et al. |
| 7,185,089 B2 | 2/2007 | Satomi et al. |

(Continued)

FOREIGN PATENT DOCUMENTS

| | | |
|---|---|---|
| CN | 101207639 A | 6/2008 |
| DE | 10015173 | 10/2001 |

(Continued)

OTHER PUBLICATIONS

Del.icio.us, retrieved from the Internet on May 17, 2008 at http://del.icio.us/, Yahoo! Inc., 701 First Avenue, Sunnyvale, CA 94089, 3 pages.

(Continued)

Primary Examiner — Anteneh Girma
Assistant Examiner — Grace Park
(74) Attorney, Agent, or Firm — Francis Lammes; Stephen J. Walder, Jr.; David A. Mims, Jr.

(57) ABSTRACT

In some embodiments a mechanism creates a bookmark of a deployable web archives. In some embodiments, the bookmark includes deployment and runtime information of current and prior invocations of the deployable web archive, at least one user- and/or author-defined external specified tag describing the deployable web archive, and/or reference/link/access information to the deployable web archives.

18 Claims, 11 Drawing Sheets

(56) References Cited

U.S. PATENT DOCUMENTS

| | | | |
|---|---|---|---|
| 7,200,568 B2 | 4/2007 | Dodd | |
| 7,203,909 B1 | 4/2007 | Horvitz et al. | |
| 7,216,287 B2 | 5/2007 | Colson et al. | |
| 7,269,664 B2 | 9/2007 | Hutsch et al. | |
| 7,289,983 B2 | 10/2007 | Best et al. | |
| 7,337,370 B2 | 2/2008 | Haynes et al. | |
| 7,366,795 B2 | 4/2008 | O'Neil et al. | |
| 7,366,990 B2 | 4/2008 | Pitroda | |
| 7,376,652 B2 | 5/2008 | Hayes-Roth | |
| 7,426,548 B2 | 9/2008 | Griffin et al. | |
| 7,536,637 B1* | 5/2009 | Nauerz et al. | 715/230 |
| 7,624,160 B2 | 11/2009 | Henderson et al. | |
| 7,770,101 B2 | 8/2010 | Hesmer et al. | |
| 7,895,234 B2 | 2/2011 | Lillie et al. | |
| 7,904,818 B2 | 3/2011 | Lauridsen et al. | |
| 7,949,692 B2 | 5/2011 | Lemar et al. | |
| 2001/0034771 A1 | 10/2001 | Hutsch et al. | |
| 2002/0029296 A1 | 3/2002 | Anuff et al. | |
| 2002/0152242 A1 | 10/2002 | Meyer et al. | |
| 2003/0101412 A1 | 5/2003 | Eid | |
| 2003/0148763 A1 | 8/2003 | Kikuchi | |
| 2004/0010598 A1 | 1/2004 | Bales et al. | |
| 2004/0049589 A1 | 3/2004 | Papanikolaou et al. | |
| 2004/0167896 A1 | 8/2004 | Eakin | |
| 2004/0187111 A1 | 9/2004 | Eakin | |
| 2004/0243928 A1 | 12/2004 | Hesmer et al. | |
| 2005/0065913 A1 | 3/2005 | Lillie et al. | |
| 2005/0246632 A1* | 11/2005 | Guido et al. | 715/517 |
| 2005/0256940 A1 | 11/2005 | Henderson et al. | |
| 2005/0267789 A1 | 12/2005 | Satyadas et al. | |
| 2005/0273717 A1 | 12/2005 | Breeden et al. | |
| 2005/0278323 A1 | 12/2005 | Horvitz et al. | |
| 2005/0278562 A1 | 12/2005 | Haynes et al. | |
| 2006/0026557 A1 | 2/2006 | Petri | |
| 2006/0031849 A1 | 2/2006 | Barta et al. | |
| 2006/0036734 A1* | 2/2006 | Breeden et al. | 709/225 |
| 2006/0036954 A1* | 2/2006 | Satyadas et al. | 715/742 |
| 2006/0053376 A1 | 3/2006 | Ng et al. | |
| 2006/0059125 A1 | 3/2006 | Yan | |
| 2006/0064406 A1 | 3/2006 | Ehrich et al. | |
| 2006/0064422 A1 | 3/2006 | Arthurs et al. | |
| 2006/0095676 A1 | 5/2006 | Dzierzon et al. | |
| 2006/0277199 A1 | 12/2006 | Joret et al. | |
| 2006/0282819 A1* | 12/2006 | Graham et al. | 717/113 |
| 2006/0287919 A1 | 12/2006 | Rubens et al. | |
| 2007/0016893 A1 | 1/2007 | Branda et al. | |
| 2007/0038599 A1 | 2/2007 | Pearson | |
| 2007/0043766 A1* | 2/2007 | Nicholas et al. | 707/104.1 |
| 2007/0067722 A1 | 3/2007 | Ames et al. | |
| 2007/0094595 A1 | 4/2007 | Heck et al. | |
| 2007/0112913 A1 | 5/2007 | Bales | |
| 2007/0260702 A1 | 11/2007 | Richardson et al. | |
| 2007/0288488 A1* | 12/2007 | Rohrs et al. | 707/100 |
| 2007/0300179 A1 | 12/2007 | Friedlander | |
| 2008/0016116 A1 | 1/2008 | Tarr | |
| 2008/0033921 A1 | 2/2008 | Arrouye et al. | |
| 2008/0034420 A1 | 2/2008 | Chang | |
| 2008/0040313 A1* | 2/2008 | Schachter | 707/2 |
| 2008/0052369 A1 | 2/2008 | Weber et al. | |
| 2008/0052372 A1* | 2/2008 | Weber et al. | 709/217 |
| 2008/0072145 A1 | 3/2008 | Blanchard et al. | |
| 2008/0091985 A1 | 4/2008 | Haynes et al. | |
| 2008/0097986 A1* | 4/2008 | Shih et al. | 707/5 |
| 2008/0097987 A1* | 4/2008 | Shih et al. | 707/5 |
| 2008/0120343 A1 | 5/2008 | Altrichter et al. | |
| 2008/0127133 A1* | 5/2008 | Aghara et al. | 717/140 |
| 2008/0154949 A1* | 6/2008 | Brooks et al. | 707/103 R |
| 2008/0201645 A1* | 8/2008 | Francis et al. | 715/742 |
| 2008/0270924 A1 | 10/2008 | Yordanov et al. | |
| 2008/0281769 A1 | 11/2008 | Hibbets | |
| 2009/0031401 A1* | 1/2009 | Cudich et al. | 726/4 |
| 2009/0063442 A1 | 3/2009 | Gaurav | |
| 2009/0100358 A1 | 4/2009 | Lauridsen et al. | |
| 2009/0100372 A1 | 4/2009 | Lauridsen et al. | |
| 2009/0182727 A1 | 7/2009 | Majko | |
| 2009/0217352 A1 | 8/2009 | Shen et al. | |
| 2009/0235149 A1* | 9/2009 | Frohwein | 715/205 |
| 2010/0017385 A1* | 1/2010 | Wilcox et al. | 707/5 |
| 2010/0070482 A1 | 3/2010 | Punaganti Venkata et al. | |
| 2011/0055193 A1 | 3/2011 | Lauridsen et al. | |
| 2011/0106835 A1 | 5/2011 | Lauridsen et al. | |
| 2011/0131501 A1 | 6/2011 | Lauridsen et al. | |
| 2012/0204121 A1 | 8/2012 | Lauridsen et al. | |

FOREIGN PATENT DOCUMENTS

| | | |
|---|---|---|
| JP | 2005506617 A | 3/2005 |
| JP | 2006107012 | 4/2006 |
| JP | 2007-133871 A | 5/2007 |
| KR | 2006084869 | 7/2006 |

OTHER PUBLICATIONS http://support.mozilla.com/en-US/kb/Smart+Bookmarks+folders, accessed Aug. 19, 2009, 6 pages.
International Search Report and Written Opinion dated Dec. 1, 2010 for International Application No. PCT/EP2010/062738, 13 pages.
USPTO U.S. Appl. No. 11/872,238, 4 pages.
USPTO U.S. Appl. No. 11/872,241, 2 pages.
USPTO U.S. Appl. No. 12/174,420, 3 pages.
USPTO U.S. Appl. No. 12/547,853, 3 pages.
USPTO U.S. Appl. No. 12/608,423, 3 pages.
USPTO U.S. Appl. No. 12/984,575, 3 pages.
"Community Systems Research at Yahoo!", SIGMOD Record, vol. 36, No. 3, Sep. 2007, pp. 47-54.
"Delicioussocial bookmarking", http://del.icio.us, accessed Aug. 19, 2009, 6 pages.
"Developing portlets for offline content", http://publib.boulder.ibm.com/infocenter/weahelp/5.1/index.jsp?topic=/com.ibm.websphere.eas.doc/dev_offline.html, accessed Jul. 17, 2009, 2 pages.
"Dogear Bookmarks", https://www.ibm.com/dogear; https://www.ibm.com/dogear/about?lang=en, accessed Aug. 19, 2009, 6 pages.
Strauss, Howard, "What Is a Portal, Anyway?", TechTalks Event, From Internet, Jan. 20, 2000, 9 pages.
Hong, Lichan et al., "SparTag.us: A Low Cost Tagging System for Foraging of Web Content", Proceedings of 2008 International Working Conference on Advanced Visual Interfaces (AVI'08), Naples, Italy, May 2008, pp. 65-72.
"Extensible Markup Language (XML)", World Wide Web Consortium, retrieved in the Internet on May 17, 2008 at http://www.w3.org/XML/, World Wide Web Consortium, Massachusettes Institute of Technology, 32 Vassar Street, Room 32-G515, Cambridge, MA 02139, 5 pages.
"IBM File Server", http://publib.boulder.ibm.com/infocenter/wpdoc/v510/index.jsp?topic=/com.ibm.wp.zos.doc/portlets/file_server.html, 2007, 1 page.
"JSR 162: Portlet API", http://www.jcp.org/en/jsr/detail?id=162, 2002, 6 pages. 2002.
"JSR 168: Portlet Specification", Sun Microsystems, retrieved from the Internet on May 17, 2008 at http://www.jcp.org/en/jsr/detail?id=168, Sun Microsystems, Inc., 4150 Network Circle, Santa Clara, CA 95054, 9 pages.
"Overview of Offline Portal Content", http://publib.boulder.ibm.com/infocenter/weahelp/5.1/index.jsp?topic=/com.ibm.websphere.eas.doc/ovr_offline.html, accessed Jul. 17, 2009, 2 pages.
Allamaraju, Subbu et al., "Portlet Preferences", Dev2Dev, Feb. 2, 2004, retrieved from the Internet on May 17, 2008 at http://dev2dev.bea.com/pub/a/2004/02/portlet_preferences.html, World Wide Web Consortium, Massachusetts Institute of Technology, 32 Vassar Street, Room 32-G515, Cambridge, MA 02139, 14 pages.
Allamaraju, Subbu, "Portlet Preferences", http://web.archive.org/web/20071220054045/dev2dev.bea.com/1pt/a/171; Feb. 2, 2004, accessed Aug. 19, 2009, 8 pages.
Coles, Alistair et al., "A Framework for Coordinated Multi-Modal Browsing with Multiple Clients", WWW 2003, pp. 718-726.
Diaz, Oscar et al., "Invoking Web Applications from Portals: Customisation Implications", Onekin Research Group, University of

(56) References Cited

OTHER PUBLICATIONS the Basque Country, Department of Computer Languages and Systems, PO Box 649, 20080 San Sebastian, Spain, AH2004, LNCS 3137, 2004, pp. 75-84.

Diaz, Oscar et al., "Tagging-Aware Portlets", ICWE 2009, LNCS 5648, Engineering, Springer Berlin Heidelberg, Berlin, Heidelberg, Jun. 24, 2009, XP019120503, ISBN: 978-3-642-02817-5, pp, 61-75.

Firan, Claudiu S. et al., "The Benefit of Using Tag-Based Profiles", IEEE, Fifth Latin American Web Congress, 2007, pp. 32-41.

Hepper, Stefan, "Caching data in JSR 168 portlets with WebSphere Portal V5.1", http://www.ibm.com/developerworks/websphere/library/techarticles/0508_hepper/0508_hepper.html, 2005, 9 pages.

Jing, Wu et al., "Mining Personalization Interest and Navigation Patterns on Portal", Advances in Knowledge Discovery and Data Mining, Berlin, Heidelberg, vol. 4426, May 22, 2007, pp. 948-955.

Nicklous, Martin S., "JSR 168: Portlet Specification", The Java Community Process (SM) Program, http://www.jcp.org/en/jsr/detail?id=168, accessed Aug. 19, 2009, 11 pages.

Patil, Aashish, "Unclog the server bottleneck with active containers", http://www.ibm.com/developerworks/web/library/wa-actcont/index.html, 2004, 4 pages.

Storey, Margaret-Anne et al., "Waypointing and Social Tagging to Support Program Navigation", CHI 2006, pp. 1367-1372.

Final Office Action mailed Jan. 19, 2012 for U.S. Appl. No. 12/608,423; 17 pages.

Response to Office Action filed Dec. 21, 2011 for U.S. Appl. No. 12/608,423; 12 pages.

Response to Office Action filed with the USPTO on Jan. 9, 2011, U.S. Appl. No. 12/547,853, 12 pages.

Interview Summary mailed Jul. 20, 2012 for U.S. Appl. No. 12/608,423; 3 pages.

Office Action mailed Aug. 10, 2012 for U.S. Appl. No. 12/608,423; 17 pages.

Response to Final Office Action filed Jul. 17, 2012, U.S. Appl. No. 12/547,853, 11 pages.

Final Office Action mailed Nov. 26, 2012, U.S. Appl. No. 12/608,423, 18 pages.

Notice of Allowance mailed Dec. 19, 2012 for U.S. Appl. No. 12/547,853; 19 pages.

Response to Office Action filed with the USPTO on Nov. 9, 2012, U.S. Appl. No. 12/608,423, 12 pages.

U.S. Appl. No. 13/420,094, 3 pages.

International Search Report and Written Opinion dated Dec. 29, 2008, International Application No. PCT/EP2008/063769, 10 pages.

International Search Report and Written Opinion dated Dec. 29, 2008, International Application No. PCT/EP2008/063770, 10 pages.

Appeal Brief filed Mar. 25, 2013, U.S. Appl. No. 12/608,423, 21 pages.

Notice of Allowance mailed Mar. 21, 2013 for U.S. Appl. No. 12/547,853; 18 pages.

Final Office Action mailed Apr. 17, 2012 for U.S. Appl. No. 12/547,853; 20 pages.

Interview Summary mailed Jul. 13, 2012 for U.S. Appl. No. 12/547,853; 3 pages.

\* cited by examiner

US 8,583,658 B2

CREATING AND MANAGING REFERENCE ELEMENTS OF DEPLOYABLE WEB ARCHIVE FILES

This application is a divisional of application Ser. No. 12/174,420, filed Jul. 16, 2008, status pending.

BACKGROUND

1. Field of Invention

The present invention relates to executable web components, and more specifically to bookmarking deployable web archives.

2. Description of Related Art

Conventional software application servers may include web portals. The Web portals allow partners, employees and customers to choose their user experience, with personalized applications based on role, context, actions, location, preferences and team collaboration needs. The web portals are deployable on one or more software application servers.

When searching for portlets acts to deploy on the software application servers, authorized end-users and administrators can search for portlet file names and/or descriptions of portlet functionality, then review the search results to find descriptions and linked archive files that match. Users and administrators can also send each other web archive files to deploy, or download these archive files from a variety of sites.

SUMMARY

According to an embodiment, a method includes creating a bookmark of a deployable web archive, wherein the bookmark includes deployment and runtime information of current and prior invocations of the deployable web archive, one or more external specified tag(s) describing the deployable web archive, the external specified tag(s) being editable by the creator of the tag, and reference/link/access information to the deployable web archives.

According to another embodiment, a method includes creating a tag of the network-deployable executable components, wherein the tag includes activity information of the web executable component, the tag having a name and then displaying the tag name and at least a portion of the activity information in accordance with an authorization that is specified by a user that deployed the executable component.

According to yet another embodiment, a method includes displaying a tag control in a graphical user interface of a portal tab, and transmitting configuration options associated with the tag to a web service, the configuration options including a specification of the extent of sharing with a specified user group usage statistics of a user for the portlet.

According to still another embodiment, a method includes locating a bookmark of a web archive using a social bookmarking service and deploying the web archive from the bookmark in the social bookmarking service.

DETAILED DESCRIPTION

Figure 1:
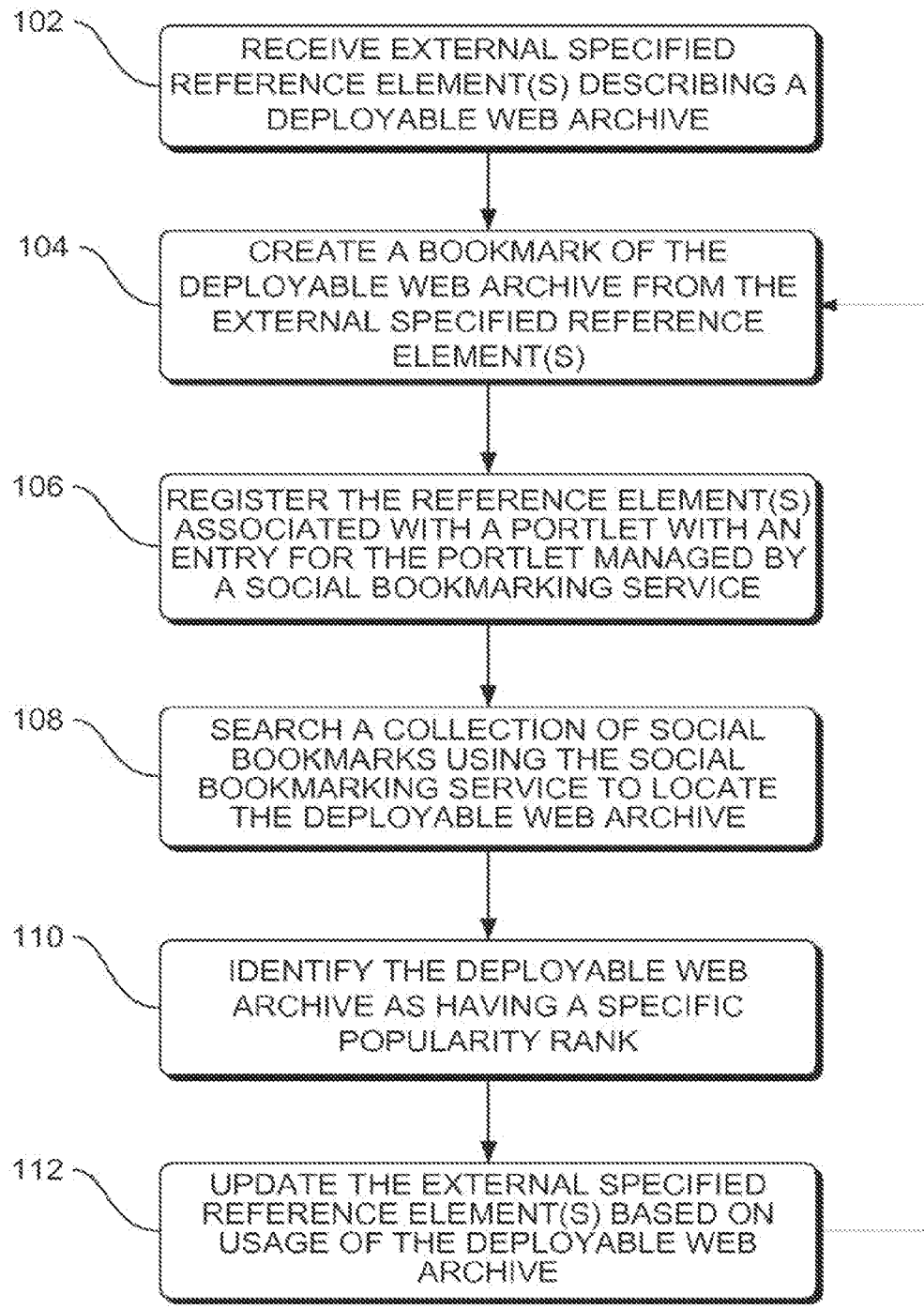
FIG. 1 depicts an embodiment of a method for bookmarking and tagging deployable web archive files.

The terminology used herein is for the purpose of describing particular embodiments only and is not intended to be limiting of the invention. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In the following detailed description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to FIG. 1, a method 100 for bookmarking and tagging deployable web archive files is described. Bookmarks and tags are collectively referred to as reference elements. The web archive files are deployable in a runtime environment such as software application server, to a web site where the reference elements can be viewed and the content searched and used by other end-users.

In some embodiments, method 100 allows the user of a runtime environment such as software application server, to create a collection of social reference elements for the user's deployable archive files. The user of the runtime environment registers with a social bookmarking service delivered on a network (e.g. on the intranet or portal intranet) for the user to store bookmarked web archive files, add tags at the selection and by definition of the user, and designate individual reference elements as public, private, or group-based, according to membership of the user in groups facilitated by software tools such as external security engines that manage group membership on the network. The registration provides authorization based on membership of a viewer or user in a user-group. Group-restricted reference elements can be viewed by members of that group. Integration with an organizational group intranet can be included to automatically detect existing intranet groups. Visitors to the social bookmarking portlet site or social bookmarking web component can search for keywords tagged, a specific user's reference elements (given permission to view), or other criteria such as popularity and most recently deployed among a group in the network to see the portlet reference elements and classification schemes that registered users have created and saved. Users can quickly choose to deploy other user's tagged/bookmarked portlets/web archive files in their own portal environments by simply browsing to the reference element to link to the hosting site of that archive file.

Method 100 may include receiving one or more external specified tag(s), at block 102. The tag(s) describe a deployable web archive or other enterprise application. The tag(s) may be received from a user in which case the tag(s) may have been created by the user from which the tags(s) were received, or the tag(s) may be received from a system that performs method 100.

Examples of web archive files are Java Enterprise Edition archive (EAR) files, servlets, and portlets. Servlets are objects that extend the capabilities of applications hosted by the software application server and are accessed via a request-response programming model. A servlet may maintain state across many server transactions and receives a request and generates a response based on that request. Portlets are pluggable user interface components that are managed and displayed in a web portal. Portlets produce fragments of markup code that are aggregated into a portal page. Typically, following the desktop metaphor, a portal page is displayed as a collection of non-overlapping portlet windows, where each portlet window displays portlet.

The tag(s) may be group-based tag(s) that describe a deployable web archive that is associated with a particular group. The group-based tag(s) may be collected and generated from individual statistics and access to individual participation in a group. For example, a Director of an organization can see which portlet is the most popular among direct-reporting employees based on the tag(s) uploaded to the site and statistics generated based on the most frequently tagged portlets by employees in a certain group.

Method 100 may include creating a reference element of the deployable web archive from the one or more external specified tag(s), at block 104. The reference element may include deployment and runtime information of current and prior invocations of the deployable web archive, one or more external specified tag(s) describing the deployable web archive, and reference, link and/or access information to the deployable web archives The one or more external specified tag(s) may be editable by the user from which the tag(s) were received. Accordingly, method 100 provides auto-generated reference elements about deployment usage of the deployable web archive or other enterprise application.

The deployment and runtime information may include refresh frequency, length of time since initial deployment, interactivity data such as hypertext markup language (HTML) fragment refresh in portlet, and/or identification of particular tabs and pages in the users portal instance in which the files are deployed, etc. In some embodiments, method 100 supports bookmarking and tagging of enterprise web application usage of a central social bookmarking site.

Bookmarked files may be tagged both manually with user-defined keywords and also automatically with user-chosen usage information about the archive files. Method 100 allows users of a portal environment to tag and bookmark the enterprise applications (e.g. enterprise archive (EAR) files, servlets, and/or portlets) deployable in a portal environment.

In method 100, users may choose to include reference elements based on individual usage history, where these reference elements are generated by the usage statistics gathered automatically.

Method 100 may include updating or registering the reference element associated with a portlet with an entry for that portlet managed by a social bookmarking service, at block 106. The portlet may be a social bookmark portlet, which provides a user interface to the collection and organization of bookmarked portlets available on the network. The bookmark may be viewed and retrieved by other registered end-users to enable the other registered end-user to deploy their own instance of the deployable web archives. The bookmarking site or web component can be included as a tab within the other registered end-user's portal instance. Registering the reference element with a portal at block 106 provides dynamic expression of the deployable web archive to bookmarking systems, including social bookmarking systems.

Social bookmarking is a method for Internet users to store, organize, search, and manage bookmarks of web pages on the Internet with the help of metadata. In a social bookmarking system, users save links to web pages that the users want to remember and/or share. The bookmarks are usually public, and can be saved privately, shared only with specified people or groups, shared only inside certain networks, or another combination of public and private domains. The specified people or groups can usually view these bookmarks chronologically, by category or tags, or via a search engine. Most social bookmark services encourage users to organize their bookmarks with informal tags instead of the traditional browser-based system of folders, although some services feature categories/folders or a combination of folders and tags. The social bookmark services also enable viewing bookmarks associated with a chosen tag, and include information about the number of users who have bookmarked them. Some social bookmarking services also draw inferences from the relationship of tags to create clusters of tags or bookmarks. Many social bookmarking services provide web feeds for the lists of bookmarks, including lists organized by tags. The web feeds allow subscribers to become aware of new bookmarks as they are saved, shared, and tagged by other users.

Method 100 may include searching a collection of social bookmarks using a social bookmarking service to locate the deployable web archive, at block 108 and method 100 may include identifying the deployable web archive as having a specific popularity rank, and recentness rankings for latest deployment and latest markup language fragment refresh among bookmarked portlets in a group, for a plurality of reference elements, at block 110. The tags pertaining to popularity and recentness may be determined from an analysis of a plurality of reference elements of a plurality of deployed web archives.

Method 100 may include updating the one or more external specified tag(s) based on usage of the deployable web archive, at block 112. The usage of the deployable web archive may be determined from monitoring the activity of the deployable web archives. Thereafter, at block 104, the bookmark of the deployable web archive is regenerated or updated from the one or more updated external specified tag(s), at block 104. Updating the tag(s) at block 112 can be performed in response to a refresh event that is initiated by a system, in response to a timed event, such as a timer daemon that invokes the updating every hour, for example, and/or in response to user input that updates data that is pertinent to the network-deployable executable component.

Method 100 helps identify which web applications are being executed by other end-users. Method 100 also helps determine the usage information about the deployed applications or files of those end-users. In method 100, the end-users can monitor the popularity of a deployable archive file, such as a portlet.

In a particular example of method 100, a recently-promoted Director is preparing for a meeting with an executive manager of the Director in which all project milestone information will be reviewed. Direct-reporting subordinates of the Director and all product managers with teams of developers of the Director have each deployed a new milestone portlet which allows the developers to keep track, directly in their software application server portal instance, of the current status of their respective projects. As the project current status is updated, the data is updated on a server and different levels can be viewed according to access privileges. Without method 100, the newly promoted Director does not realize that this portlet exists, so the Director asks a technical assistant to prepare a report manually. The technical assistant now collects information manually to form a static report. However, in the performance of method 100, the Director merely visits the social bookmarking tab in a software application server portal instance of the Director. The Director navigates to the employee group of the Director and views the most popular tagged portlets which are deployed by employees of the Director. The Director sees that 7 out of 8 of the direct-reporting subordinates of the Director use a particular milestones portlet. This portlet has reference elements such as "team", "report", "progress" and "status." The Director can now click on the socially bookmarked web application archive (WAR) file to automatically update portal content of the Director. The Director can then deploy the same portlet in the software application server portal instance, and view the data entered by direct-reporting subordinates of the Director in real-time. The Director can also view other portlets that direct-reporting subordinates of the Director have tagged. Deploying the bookmarked portlet results in an option to open the portlet within a home portal tab of the Director, or a new portal tab. The new portal tab that is created and opened to deploy this chosen portlet can bear the same name as one of the keywords tagged for the portal (e.g. the most popular tag for that portlet).

In a particular example of method 100, employees contribute new enterprise archive (EAR) and WAR files to community sites posted on an enterprise intranet and have privileges to customize and deploy portlets of their choosing in their software application server portal instances. Employees intend to use peer-contributed portlets. But not all of these portlets have gone through formal development processes and standardization checks. Users want to try the peer-contributed portlets, but are hesitant to trust the peer-contributed portlets. Method 100 provides recommendation folksonomies in which collaborative tagging, social classification, social indexing, and social tagging are used to collaboratively create and manage reference elements to annotate and categorize content. In folksonomies, metadata is generated not only by experts hut also by creators and consumers of the content. Usually, freely chosen keywords are used instead of a controlled vocabulary. When a user wishes to deploy a new portlet, the user can now search the social bookmarking tab of the portal of the user to see if the peer-contributed portlet has been deployed by others. The user may feel more confident and secure in knowing that a large number of employees in the user's organization have deployed the portlet and have been executing the portlet consistently for several weeks.

Figure 2:
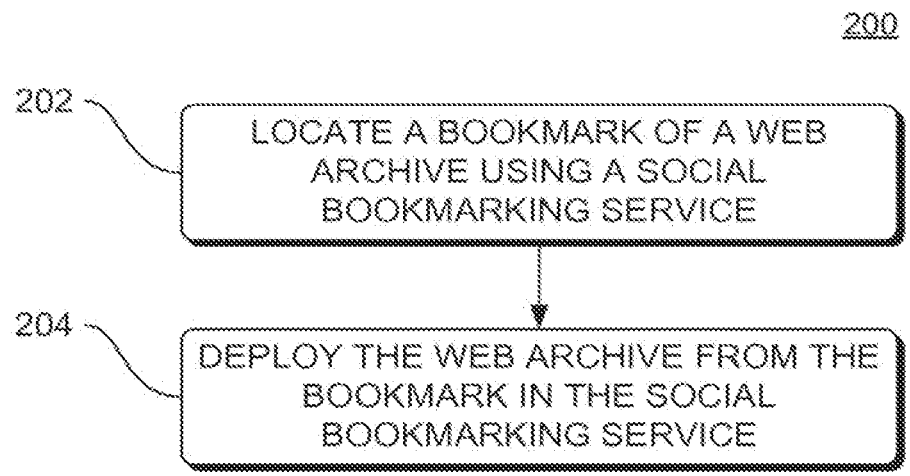
FIG. 2 depicts an embodiment of a method for dynamically deploying a portal application from a bookmark.

With reference now to FIG. 2, a method 200 for dynamically deploying a portal application from a bookmark is described. Method 200 includes locating a bookmark of a web archive using a social bookmarking service, at block 202. The locating at block 202 may further include determining a most popular tag of the web archive from bookmarks by the social bookmarking service, thereby locating the most popular web archive provided by the social bookmarking service.

Thereafter, method 200 includes deploying the web archive from the bookmark of the web archive located by the social bookmarking service, at block 204.

Figure 3:
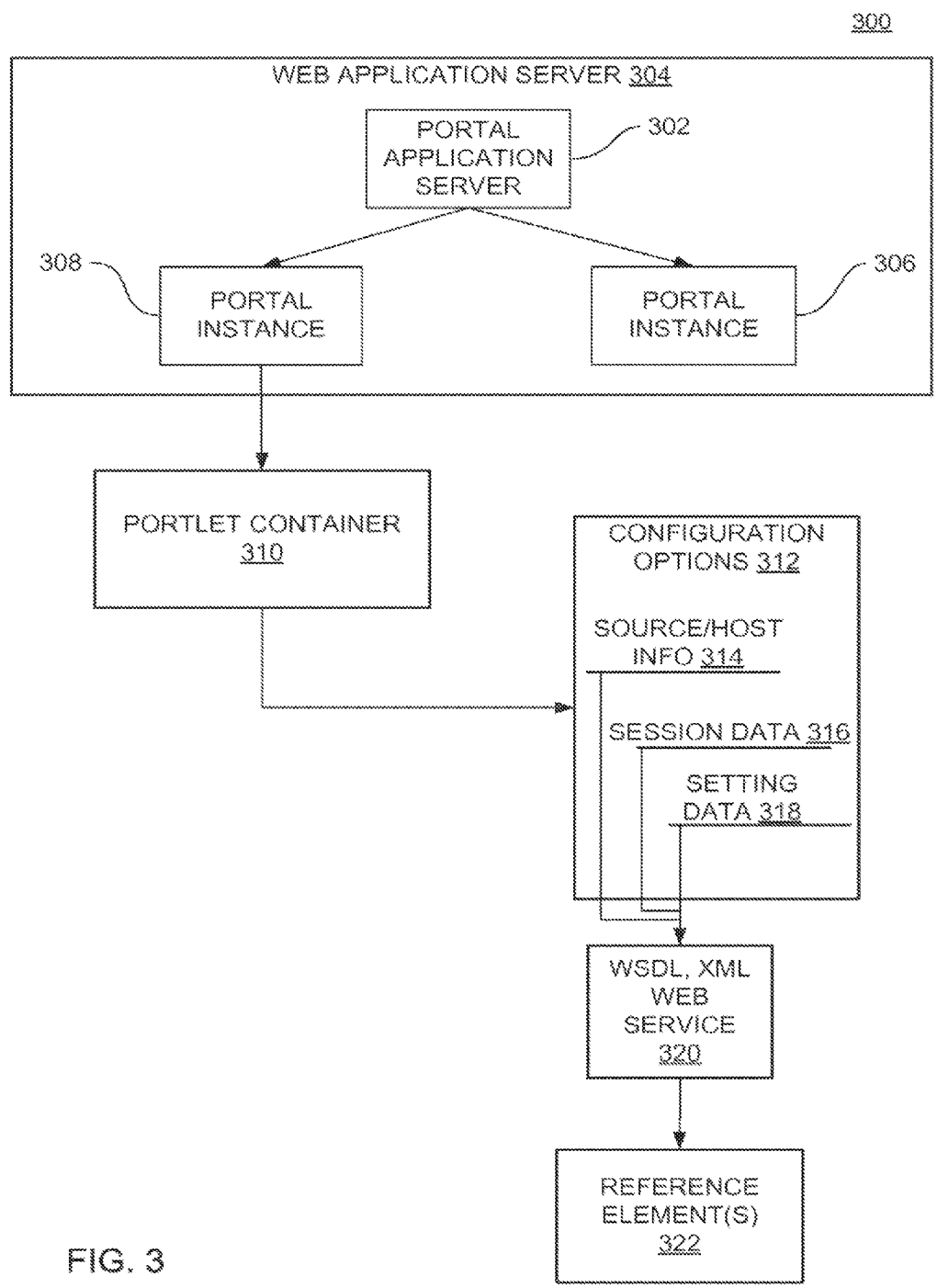
FIG. 3 depicts an embodiment of a system for bookmarking and tagging deployable web archive files.

With reference now to FIG. 3, a system 300 for bookmarking and tagging deployable web archive files is described. System 300 includes a portal application server 302 executing on a web application server 304. One example of the web application server 304 is the IBM Websphere® Application Server produced by IBM. The IBM Websphere® Application Server is a Java® 2 Platform Enterprise Edition (J2EE) server.

A number of portal instances 306 and 308, may execute on the portal application server 302. Each portal instance 308 may deploy one or more portlet container(s) 310. The portlet container 310 and deployment of portlet container(s) are described in greater detail in FIG. 4.

The portlet container 310 includes a tag control (shown in FIG. 5) that provides configuration options 312 for reference elements of a portlet of the portlet container 310. The configuration options 312 include a specification of the extent of sharing (Making public) with a specified user group the usage statistics of the user for the portlet (not shown) in the portlet container 310. The configuration data source/host information 314, session data 316 and setting data 318 is transmitted to a web service 320 with which a reference element 322 is updated.

In system 300, reference element(s) 322 of deployable web archive files are made available via a directory, stored in a hosted database management system (DMS), enabled via a web service 320 which stores download locations for web archive files and updates reference element(s) 322 with the location information as well as tag data. The directory is made available as a portlet window that is available in a portlet container 310, which registered users may add to their portal application. Aggregated bookmark/reference element information may be stored in the DMS and relevant content for the user can be retrieved via queries using web services on the DMS. The directory may be stored as a collection of database tables in a DMS.

Tag usage data, tag keywords, and bookmark data can be stored as resource metadata in the form of an Extended Markup Language (XML) Metadata Interchange (XMI) schema, or a variant thereof, with associated .xmi files or variants thereof, included in the deployment descriptor directories accompanying portlet.xml and web.xmi deployment descriptors). Once the mill schema is included, real-time tag data can be stored in associated XML files, captured as part of the deployment cycle. Administration services for the captured bookmark and tag metadata originate from the software application server, or in another deployed portlet executing within the users runtime environment, such as a software application server environment.

Figure 4:
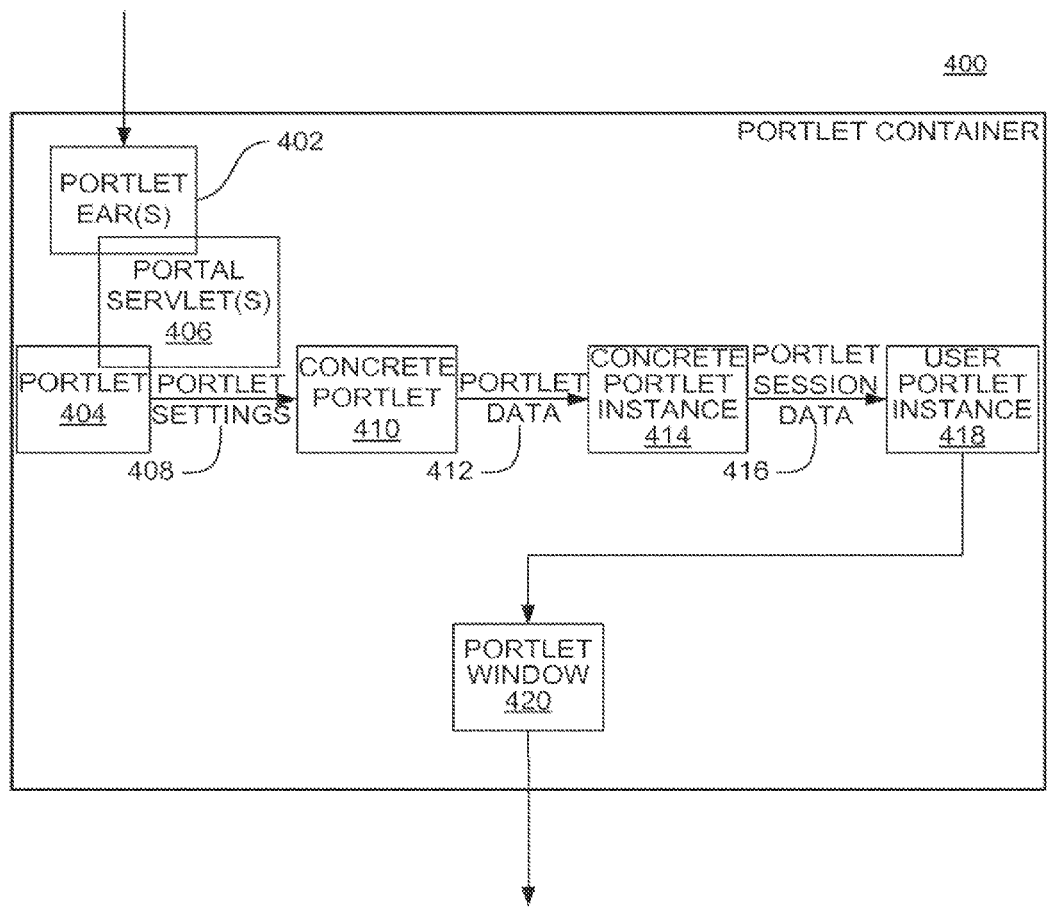
FIG. 4 depicts an embodiment of a portlet container in a system for bookmarking and tagging deployable web archive files described in FIG. 3.

With reference now to FIG. 4, a portlet container 400 includes an enterprise archive (EAR) file 402. The portlet container 400 in FIG. 4 is one example of the portlet container 310 in FIG. 3. The EAR file 402 is deployable from a portal instance (e.g. portal instance 308 in FIG. 3) from which a portlet is created. The EAR file 402 is a collection of Java archive (JAR), web archive (WAR) and enterprise Java Beans (EJB) file(s). A portlet EAR file 402 is a source for creation of a portlet 404. The author and/or owner of the portlet 404 may add reference elements to the portlet 404.

A portal instance 308 can include servlet(s) 406. Each servlet 406 can execute in a runtime environment (often Java-based) via a servlet engine (not shown in FIG. 4) which is also included in the web application server (e.g. 304 in FIG. 3). A portal runtime environment includes a servlet engine (not shown) and thus supports servlet(s) 406. Servlets 406 can be deployed in addition to, or instead of, portlets 404. Portlet settings 408 are deployable from the portlet 404 in creation of a concrete portlet 410.

The concrete portlet 410 is executable and includes data (e.g. settings) and executable program code. Portlet settings 408 are read/write accessible and persistent. The portlet settings 408 contain configuration parameters initially defined in a portlet deployment descriptor (not shown). The concrete portlet 410 is a portlet that is parameterized by the portlet settings 408. Many concrete portlets 410 can exist for each portlet 404. The use of concrete portlets 410 allows many instances of a portlet 404 to execute with different configurations, without creating extra portlet class instances. During a lifecycle of a single portlet 404, many concrete portlets 410 can be created and destroyed. No object explicitly represents the concrete portlet 410. The same concrete portlet 410 can be shared across many users. Each concrete portlet 410 is global, and in the absence of requirements for authorization, available for use by each user in the network environment. Portlet data 412 is deployable from the concrete portlet 410 in creation of a concrete portlet instance 414.

A concrete portlet instance 414 is a concrete portlet 410 that is parameterized by the portlet data 412. Many concrete portlet instances 414 can exist for each concrete portlet 410. Portlet data 412 stores persistent information for a portlet 404 that has been added to a page. For example, a user can edit a stock quotes portlet and save a list of stock symbols for the companies to track. The scope of the portlet data 412 depends on the scope of a page that the concrete portlet 410 is on.

When a concrete portlet 410 is on a group page, then the portlet data 412 contains data stored for the group of users. This is also the same for a group of users who have view access to the page. However, if users have edit access to the portlet 404 on a group page, then a new concrete portlet instance 414 is created for each user that edits the portlet 404. In this case, the portlet data 412 contains data for each user that edits the portlet 404. If a concrete portlet 410 is put on a user's page, then the portlet data 412 contains data for that user. Portlet session data 416 is used in creation of a user portlet instance 418.

A user portlet instance 418 is created after a user accesses a page that contains the portlet 404. When a user logs into the portal, the portal application server 302 creates one or more core objects for each of the user's portlets 404. Many user portlet instances 418 can exist for each concrete portlet instance 414. A user portlet instance 418 is a concrete portlet instance 414 that is parameterized by a single set of portlet session data 416. The portlet session data 416 stores transient information that is related to a single use of the portlet 404. Users directly interact with the user portlet instance 418. Each user of the user portlet instance 418 may add reference element(s) (such as reference element 322 in FIG. 3) to the user portlet instance 418. User reference elements and the author/owner reference elements provide an aggregate tagging of the portlet 404.

In regards to the deployment of portlet container(s), a portal application server e.g. portal application server 302) often includes a portlet servlet 406 as a core component. The portlet servlet 406 receives browser requests and dispatches particular JavaServer Pages (JSPs) that dynamically generate hypertext markup language (HTML), extended markup language (XML) or other types of documents in response to a web client request to build the requested portal page. Information regarding the layout and configuration of the portal page is identified by a universal resource indicator (URI) given in the request. The JSPs issue requests for web components, corresponding to the portlets to deploy, which are then invoked as portlet servlet(s) 406. The portlet servlets 406 have service methods which can be translated by the portal application server (e.g. portal application server 302) to determine the correct way to render the portlet servlet(s) 406 on the portal page. The rendering information is typically included in the code of the portlet.

From a graphical user interface (GUI) window 420, a user may interact with one or more user portlet instances 418 in the portlet container 310. The GUI window 420 is described in greater detail in FIG. 5.

Figure 5:
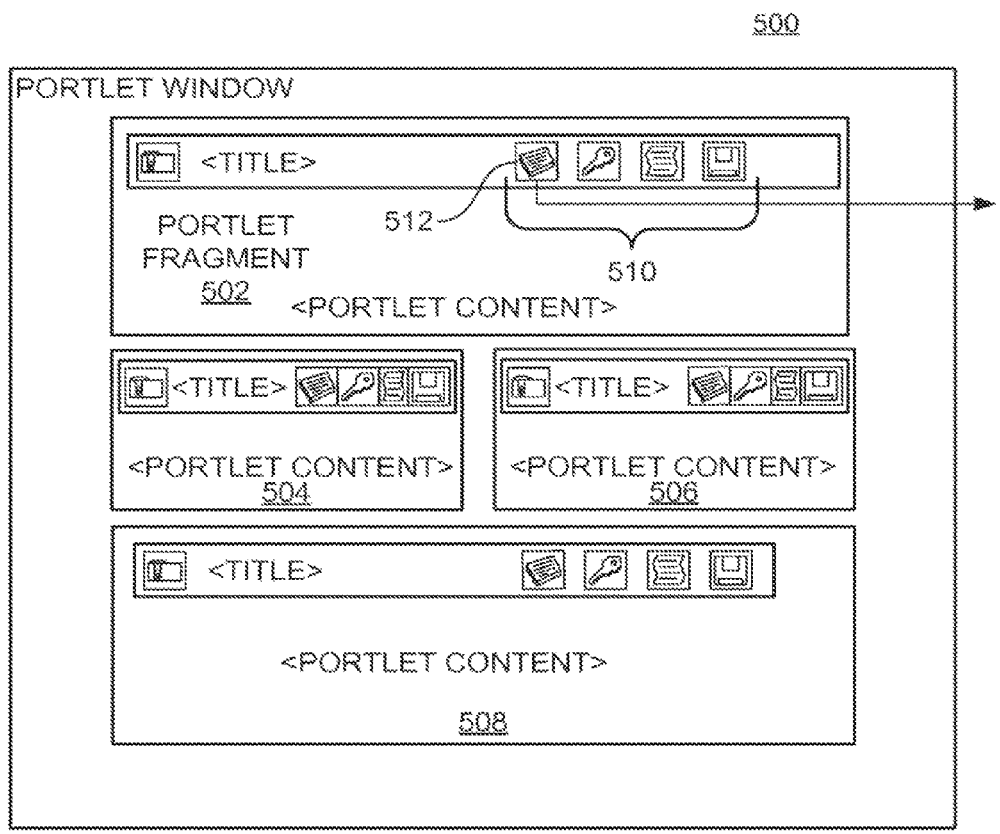
FIG. 5 depicts an embodiment of a graphical user interface window with which a user may interact with one or more user portlet instances in a system for bookmarking and tagging deployable web archive files described in FIG. 3.

With reference now to FIG. 5, graphical user interface (GUI) portlet window 500 includes a portal tab with portlet window markup fragments 502, 504, 506, and 508 of four user portlet instances (such as user portlet instance 418 in FIG. 4). A portlet (e.g. portlet 404 in FIG. 4) that is associated with the user portlet instances (e.g. user portlet instance 418) may be local or the portlet may be remote. The remote portlets may be installed remotely, and consumed locally, as in an application service provider (ASP). A control in each of the portlet window markup fragments provides configuration control over tag(s) of the portlet (e.g. portlet 404). For example, GUI portlet window 500 includes a control panel 510 that further includes a tag control 512 that provides configuration options (e.g. configuration options 314) for reference elements of the portlet 404. The GUI portlet window 500 is one example of the GUI window 420 in FIG. 4.

A social bookmarking web component or portlet, deployable as 502, 504, 506, or 508 in a portal tab may be used to search for archive files that are available to be deployed. The social bookmarking web component or portlet also displays the current users bookmarked and tagged content. Searches may be performed based on specific keywords matched to reference elements, statistics (e.g. most popular portlet deployed among all participating users, most recently deployed, most recently refreshed) as well as group usage information, for example most popular among the users in a particular group.

Buttons or other GUI user event-handling components (e.g. tag control 512) in the portlet frame interface provide a function of adding the portlet to reference elements: once pressed, the name of the deployable portlet, the location of the download site, and any reference elements the user wishes to enter can be added to the usage activity information of the reference element. Additional usage information about the web archive files can be added (e.g. "deployed between Jul. 1, 2007 and Jul. 6, 2007, deployed 8 times as of Jul. 29, 2007, etc). The tab in the portal corresponding to the bookmarked web archive files that are tagged, includes options to customize and group reference elements and categorize web archives further.

Figure 6:
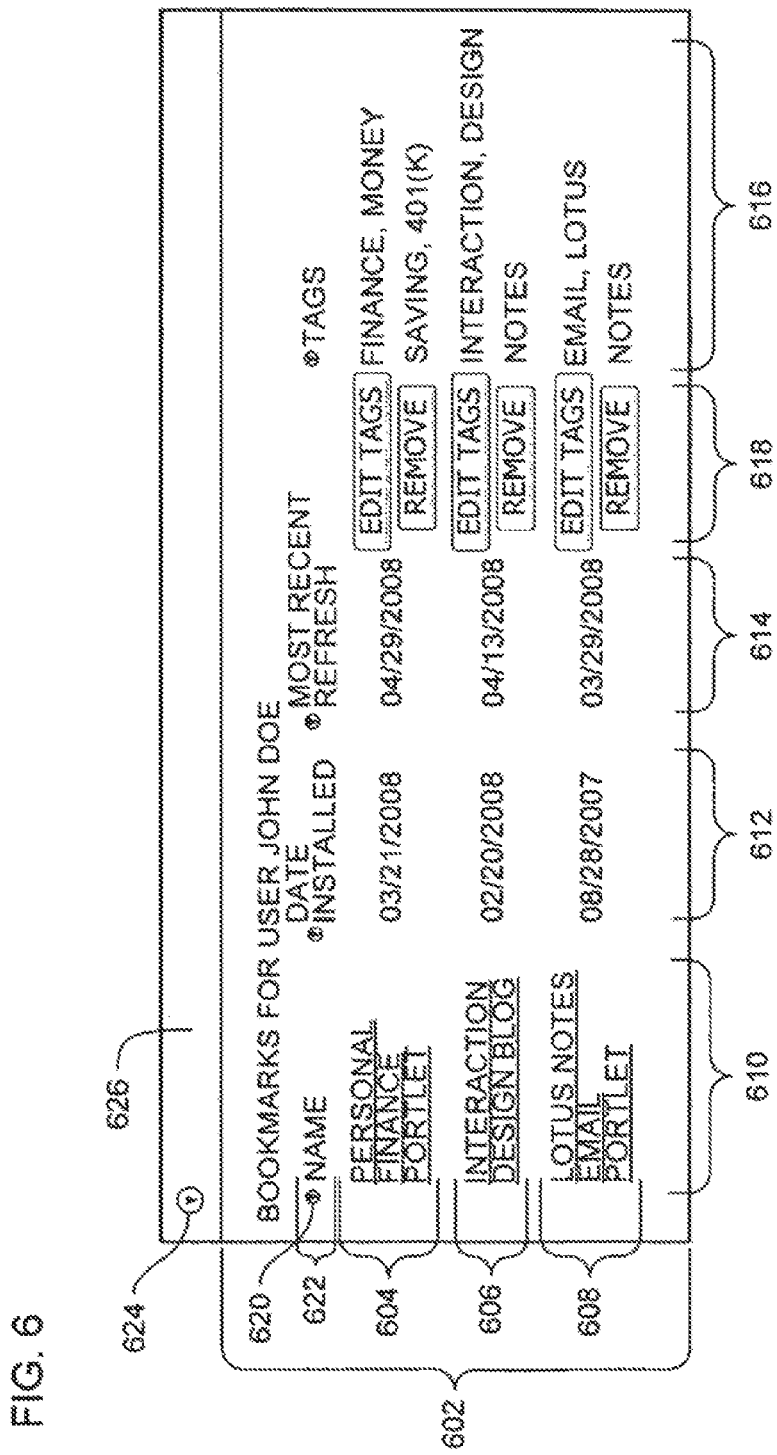
FIG. 6 depicts an embodiment of a graphical user interface display that includes a dynamic list of executable web components that have been bookmarked by a user.

With reference now to FIG. 6, a graphical user interface (GUI) display 600 includes a dynamically created list 602 of executable web components that have been bookmarked by a user. The user can view the list 602 of executable web components 604, 606 and 608 as a separate web component, or as part of a larger web component such as a portlet deployable in an environment such as a portal of a particular user. In some embodiments, the GUI display 600 is displayed as a part of a larger web component deployed in a portal of a particular user.

The GUI display 600 displays for each of the listed executable web components 1) a name 610 of the executable web component, 2) system-generated information about that web component (e.g. an installation date 612 of the web component and a most recent refresh date 614 of the web component) and 3) reference elements 616 of the executable web component. The GUI display 600 also displays buttons 618 to "remove" the reference element, and to "edit reference elements" for each of the listed executable web components. The "edit reference elements" button launches a window, which displays editable tag information by both the user and the author of the executable web component. The user may add, edit, and remove reference elements, and edit or remove the reference elements 616 originally associated with the executable web component by the creator of the executable web application.

If the user is interested in more detailed information about a bookmarked executable web component, the user may click on the list item of the executable web component. In response to clicking on the list item of the executable web component, for example items 604, 606, and 608, detailed information about the executable web component is displayed, in another section of the current web component, as described in FIGS. 9 and 10. Clicking on list items in any of FIG. 6, 7 or 8 causes FIG. 9 or 10 to be displayed. In the example of FIG. 6, the list item names 604, 606, and 608 are hyperlinks, but in other implementations, the list item names 604, 606, and 608 may be collapsible items. When clicked, more information can be displayed underneath the item, adjusting the layout of the other list items, or in a pop-up window or other view.

As shown above, the data items displayed for each executable web component list in the list 602 includes the fields: name 610, date installed 612, most recent refresh date 614, and reference elements 616 and can be sorted by clicking on the arrow icon 620 of the header 622 of the item as the sort criteria in ascending or descending order. The arrow icon 620 operates to toggle the ordering of the list 602 from the ordering of the item associated with the arrow icon 620. The list 602 in the example in FIG. 6 is sorted using the criteria for most recent refresh 614 in descending (reverse chronological) order from most recent to least recent. The user may add other fields to include information such as "Author of web component" (not shown), "Rating" (not shown), and "Popularity" (not shown) of the bookmarked web component in the same list. The set of lists that is displayed and the fields of information within each list are customizable by a user for an executable web component. The user may remove, add, and reorder lists, as well as fields within each list, in the user interface of the web component on which they are displayed. The user may also customize the lists and information therein by pressing the "customize" button (or other GUI component). Pressing the "customize" button launches a window (or other view in the GUI) with menu options (or other selection components in the GUI), for each list that may be included on the user's web component. An executable web component can include reference elements created by a particular user, reference elements created by other users in groups associated the user, most popular, etc.

In GUI display 600, clicking on the arrow 624 in the top bar 626 launches a window (not shown) or other view in the GUI that contains a menu (not shown) or other selection components in the GUI that includes controls to allow changes in the properties of the web component, or removal of the web component, to support customization of the list 602.

Figure 7:
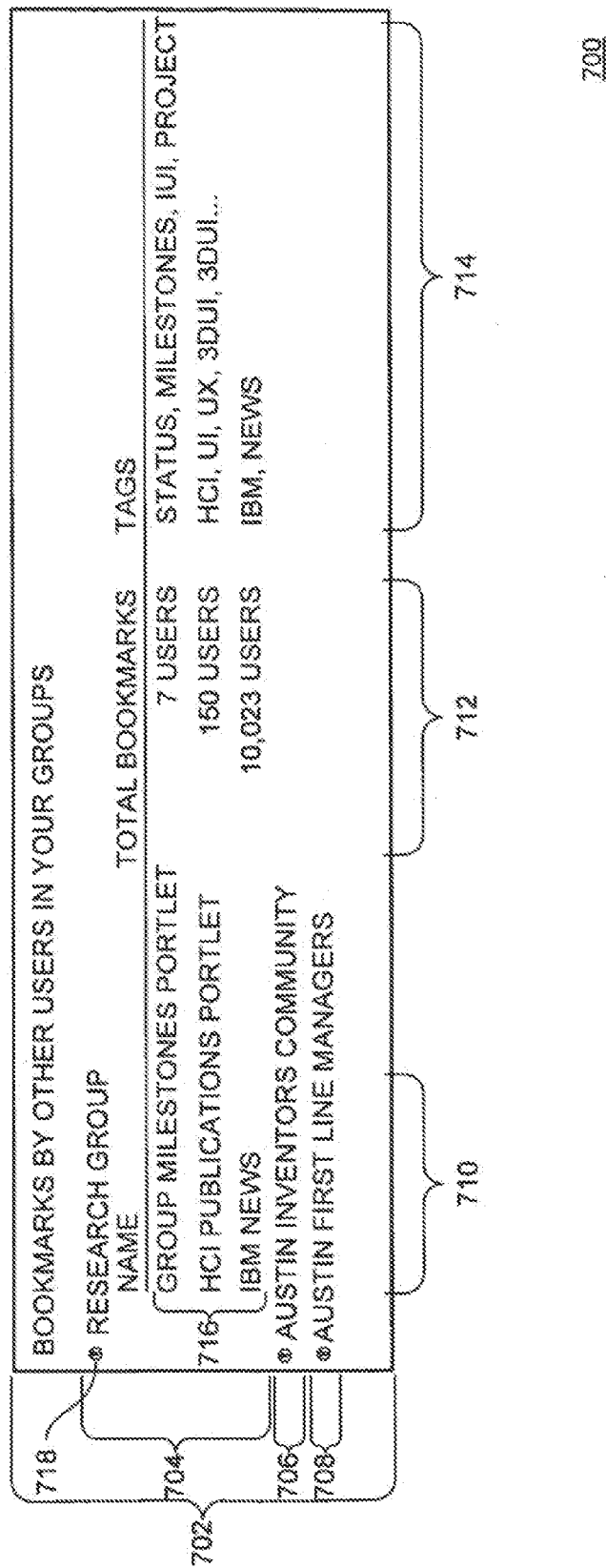
FIG. 7 depicts an embodiment of a graphical user interface display that includes a dynamic list of information describing reference elements of other users.
Figure 8:
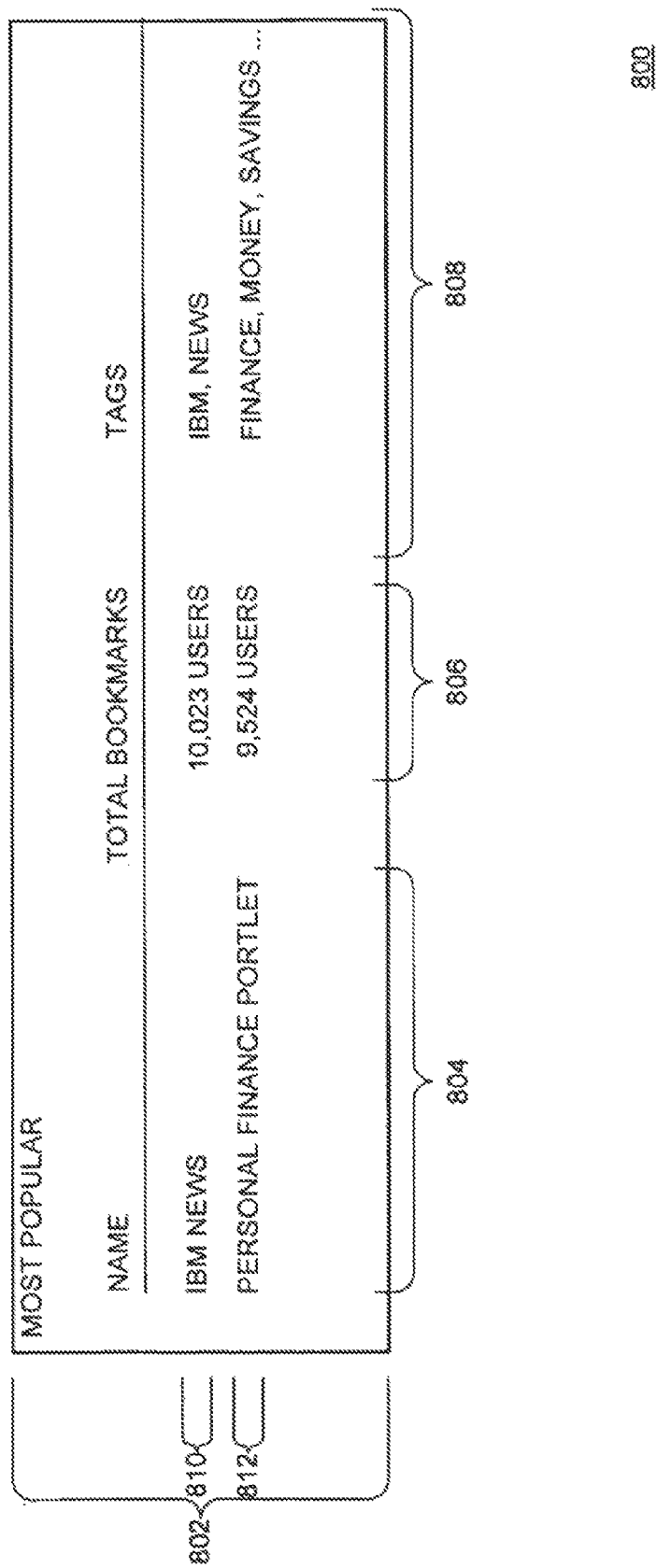
FIG. 8 depicts an embodiment of a graphical user interface display that includes a list of most popular bookmarked executable web components.

FIGS. 7 and 8 show separate lists of items that can be viewed in addition to FIG. 6.

Figure 9:
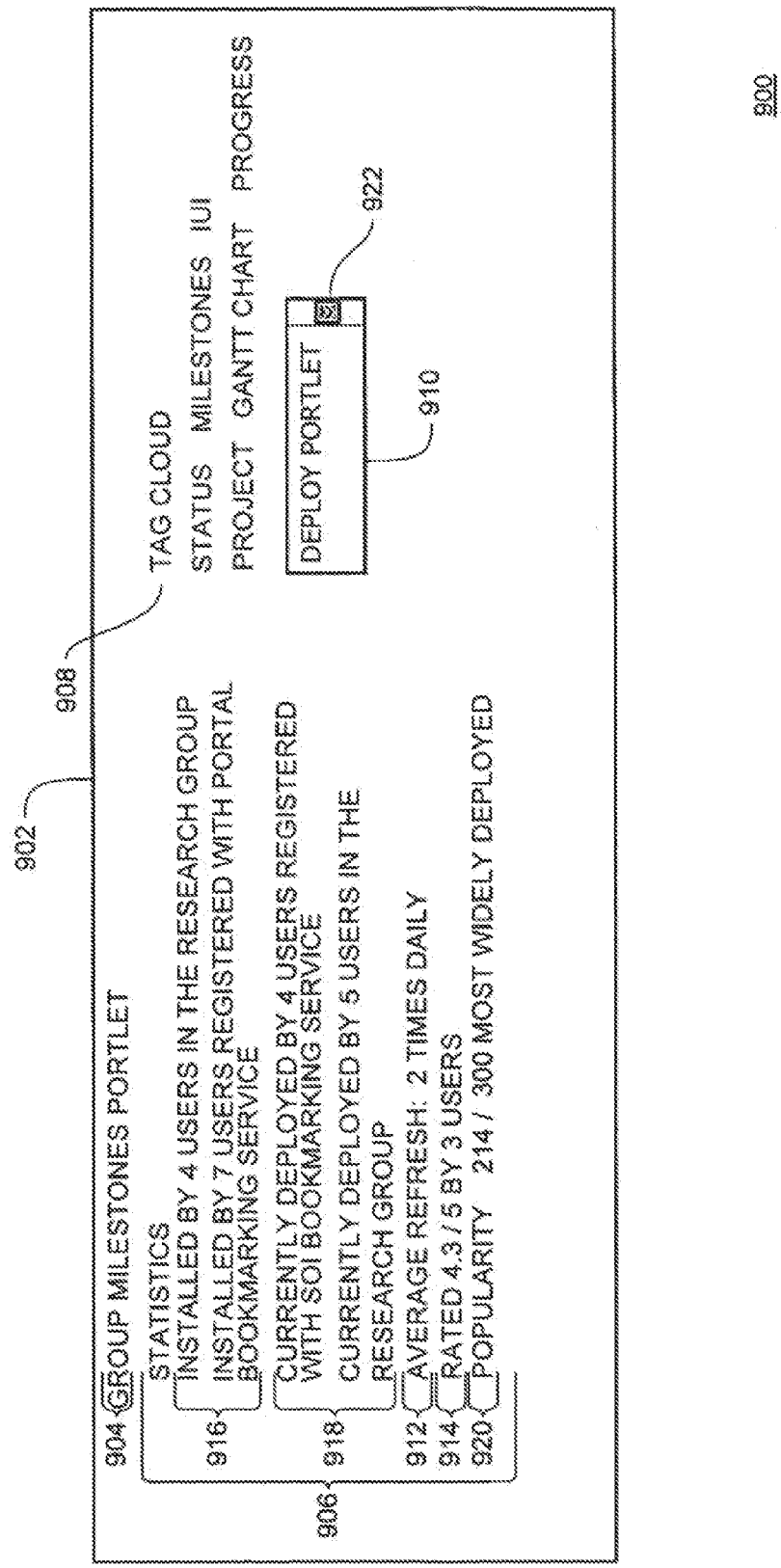
FIG. 9 depicts an embodiment of a graphical user interface display that includes a list of detailed information of a bookmarked executable web component.
Figure 10:
FIG. 10 depicts an embodiment of a graphical user interface display that includes a list of detailed information describing users that have bookmarked an executable web component.

With reference now to FIG. 7, a graphical user interface (GUI) display 700 a dynamic list 702 of information describing reference elements of other users. List 702 displays a list of groups of portlets 704, 706 and 708 or other executable web components of other users. The groups of portlets 704, 706 and 708 of the list 702 are all registered by an executable web component bookmarking service on a network. The groups of portlets 704, 706 and 708 of the list 702 are those that users registered in groups on the network in which the user is also a member have bookmarked. List 702 is sorted or organized by groups in which the current user is also a member. Similar to FIG. 6, each of the portlets or executable web component in the list 702 includes a name 710 of the executable web component, system-generated information about that web component, (e.g. total number 712 of users that have created reference elements) and reference elements 714 of the executable web component. A higher-level menu of groups 704, 706 and 708 is displayed first. Each of the groups may be expanded to display a list 716 of individual executable web components that have been bookmarked by one or more members of each group. Clicking on an arrow icon 718 that is located at the beginning of the group name activates expansion. Once a list is expanded, the list can be contracted in the same manner by clicking the same arrow icon 718. In this example, the user has expanded the "Research Group" heading which displays three bookmarked executable web components that have been bookmarked by one or more users in the "Research Group" group. After clicking on the "Group Milestones Portlet" list item, detailed information about that executable web component is displayed in another section of the current web component, as shown in FIG. 9 and FIG. 10.

As in the example of FIG. 7, the set of lists shown on the web component such as reference elements for a user (shown in FIG. 6), reference elements by other users in your groups (shown in FIG. 7), most popular (shown in FIG. 8), and within each list the fields of information (e.g. name 710, number of users that have created reference elements 712, reference elements 714), is customizable. The user may remove, add, and reorder lists, as well as fields within each list, in the user interface of the web component on which the lists are displayed. The user may also customize the lists and information therein by pressing a "customize" button (shown in FIG. 6) which launches a window with menu options for each list that may be included on the user's web component. The arrow icons (e.g. arrow icon 718) in FIG. 7 for expanding/contracting a list are similar to arrow icon 620 in FIG. 6 used for sorting.

In some embodiments, a different arrow icon 718 for "expanding" is used in FIG. 7 from the arrow icon 620 used for "sorting" in FIG. 6. In these embodiments, lists 602 in FIGS. 6 and 702 in FIG. 7 save "dynamic UT components" to facilitate visual organization for the user.

With reference now to FIG. 8, a graphical user interface (GUI) display 800 includes a list 802 of most popular bookmarked executable web components. The list 802 presents a list of executable web components, such as portlets, that have been registered by other users using an executable web component bookmarking service on a same network. The list 802 includes a name 804 of the executable web component, system-generated information about that web component (e.g. total number of users that have created reference elements 806) and reference elements for the executable web component. In this case, the list is ordered by name 804 in ascending order and is not limited to group information.

To view more detailed information about a bookmarked executable web component, the user may click on the list item (e.g. 810 or 812) of the component and thereafter, detailed information about this executable web component is displayed in another section of the current web component (see example shown in relationship of FIG. 7 to FIG. 9 and FIG. 10.

As in the example of FIG. 8, the set of lists displayed for the web component, such as reference elements for a user (shown in FIG. 6), reference elements by other users in groups of the user shown in FIG. 7), and most popular (shown in FIG. 8), and within each list the fields of information (e.g. name 804, total number of users that have created reference elements 806, reference elements 808) is customizable. The user may remove, add, and reorder lists, as well as fields within each list, in the user interface of the web component on which they are displayed. The user may also customize the lists and information therein by pressing a "customize" button (not shown in FIG. 8). Pressing the "customize" button (e.g. arrow 624 in FIG. 6) launches a window with menu options for each list that may be included on the user's web component.

With reference now to FIG. 9, a graphical user interface (GUI) display 900 includes a list 902 of detailed information of a bookmarked executable web component. GUI display 900 is displayed after a user has clicked on an item in the list 716 of individual executable web components in FIG. 7 (or 604, 606, or 608 in FIG. 6; or 810, 812 in FIG. 8). For example, GUI display 900 is displayed after a user has clicked on the "Group Milestones Portlet" list item 904 in the list 716 of individual executable web components in FIG. 7.

List 902 displays detailed information about the users who bookmarked the subject bookmarked executable web component. List 902 also displays reference elements and usage of the "Group Milestones Portlet" component of FIG. 7. The list 902 includes sections on statistics 906, tag cloud 908, and a deploy portlet button 910. All sections appear under the heading 904 of the larger section for the executable web component of interest, e.g. "Group Milestones Porlet,"

The statistics section 906 in list 902 includes system-generated and user-generated statistics about the "Group Milestones Portlet" including system-generated information such as: average refresh rate 912 of the executable web component, and popularity 920. In the example of FIG. 9 popularity 920 is the rank in terms of number of people who have bookmarked and deployed the executable web component, where the component deployed the most out of components within the system is ranked highest. Other system-generated information includes the number of users 916 who have bookmarked the executable web component and have simply installed the executable web component but are not currently deploying or executing the executable web component, versus the number of user 918 who have bookmarked the executable web component and are actively deploying or executing the executable web component. The statistics section 906 also contains a system-aggregated overall rating 914 of user-given ratings of the bookmarked executable web component.

The tag cloud section 908 includes all current reference elements assigned by all the users who have bookmarked the executable web component. The assigned current reference elements include the default reference elements given by the creators of the executable web component if users chose not to edit those reference elements. The size of the tag on the display is proportional to the collective number of citations and references to that tag by all users who have bookmarked and tagged the executable web component.

In some embodiments, clicking on the deploy portlet button 910 deploys the executable web component in a networked environment of the user, such as deploying the portlet in the current portal of the user making the request. In some embodiments, the title of the button 910 is set to match or correspond to the content that is associated with the button 910. Examples of titles that correspond to the content associated with the button include "Deploy Web Component" or "Deploy Gadget." The arrow 922 on the button 910 indicates that a window will be launched upon clicking/pressing of the button 910 to provide a selection to the user to choose between deployment destination options for the executable web component (e.g. in the "Home tab" of the user portal, or the "work section" of the user portal") in the environment of the user. Other components or interaction techniques may be used in the GUI instead of a button to facilitate deployment of the portlet of interest. For example, a direct manipulation technique may be used to select deployment of the "Group Milestones Portlet" 904 to an area of the portal of the user where the user intends to deploy the portlet by dragging the name or a graphical icon of the "Group Milestones Portlet" 904 to the area of the portal of the user where the user intends to deploy the portlet. Methods for deploying the executable web component can also be presented to the user and selected by the user in GUI display 900. The methods include remote consumption of the executable web component or actual file copy of the executable from one user's directory on a distributed server to the target user's directory.

With reference now to FIG. 10, a graphical user interface (GUI) display 1000 includes a list 1002 of detailed information describing users that have bookmarked an executable web component. GUI display 1000 is displayed after a user has clicked on an item in the list 716 of individual executable web components in FIG. 7. For example, GUI display 1000 is displayed after a user has clicked on the "Group Milestones Portlet" list item in the list 716 of individual executable web components in FIG. 7. In some embodiments, the list 902 in FIG. 9 and list 1002 in FIG. 10 are combined into one displayed list (not shown).

List 1002 includes a number of items of each listed user. The items include the name 1004 of the user that bookmarked the executable web component, and system-generated information about that web component such as the current deployment status 1006 ("currently deployed" or "currently installed") and a date/timestamp of 1008 of a last refresh of the executable web component. Reference elements 1010 for the executable web component are also included in the list 1002.

Some embodiments of list 1002 include a "Usage History" button 1012 that upon clicking of the button 1012 will cause the system to display system-generated usage information associated with the bookmarking user that the user has elected to distribute. Thus the "usage history" button 1012 provides a display of how much the bookmarking user uses the executable web component. Each bookmarking user has control over which system-generated and user-generated reference elements are distributed, and with which user groups. For example, the user may choose to rate or not rate the bookmarked executable web component (as shown above with "N/A" 1014 for "Linda Macon," "Steve King" and "Hong Lee"). The user may choose not to distribute usage information such as refresh rate (as shown above with N/A for "Linda Macon" and "Hong Lee"). A user may also choose to distribute whether or not the executable web component is deployed or merely installed but not necessarily deployed in his or her portal. White the example shown uses "N/A" for clarity, usage information about a bookmarker, which the bookmarking user chooses not to distribute my also be rendered as a blank in the user interface.

In some embodiments, clicking on an item in the list 1002 of bookmarking users displays more information about that bookmarking user, in a format similar to the customizable list 602 shown in FIG. 6. The displayed information includes the reference elements that were created by that bookmarking user the information includes system-generated and user-generated information describing each bookmarked executable web component. In some embodiments, the information is displayed in available space in the same web component view. In some embodiments, the information is displayed in anew tab in the user's web component environment. In some embodiments, the information is displayed as a replacement of the current information displayed in the current web component (e.g. "Group Milestones Portlet" information in FIG. 9 and FIG. 10) with a "back button."

In some embodiments, an executable web component can be bookmarked from a user's executable web component environment. For example, a portlet deployed in a user's portal can be bookmarked. In some embodiments, reference elements may be specified or identified as visible to registered users on the same executable web component environment network, where the visibility may be assigned by group membership. More specifically, a window launched in response to the user pressing a "bookmark" button, the window having options for making visible system-generated usage information as well as manually defined ratings and reference elements for that executable web component, for each group of which the current user, is member, as well as all users registered with the bookmarking service on the network.

In some embodiments a contextualized "Deploy Portlet" feature may also be implemented. The "Deploy Portlet" feature includes selecting/interacting with a representation of an executable web component to automatically deploy the executable web component and navigating executable web components to automatically deploy the executable web components, in community-oriented, group-situated, and context-sensitive environments for navigating available executable web components.

FIGS. 1-8 provide bookmarking of executable web components and lists of executable web components that have been bookmarked by others (e.g. registered users or specific groups).

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 11:
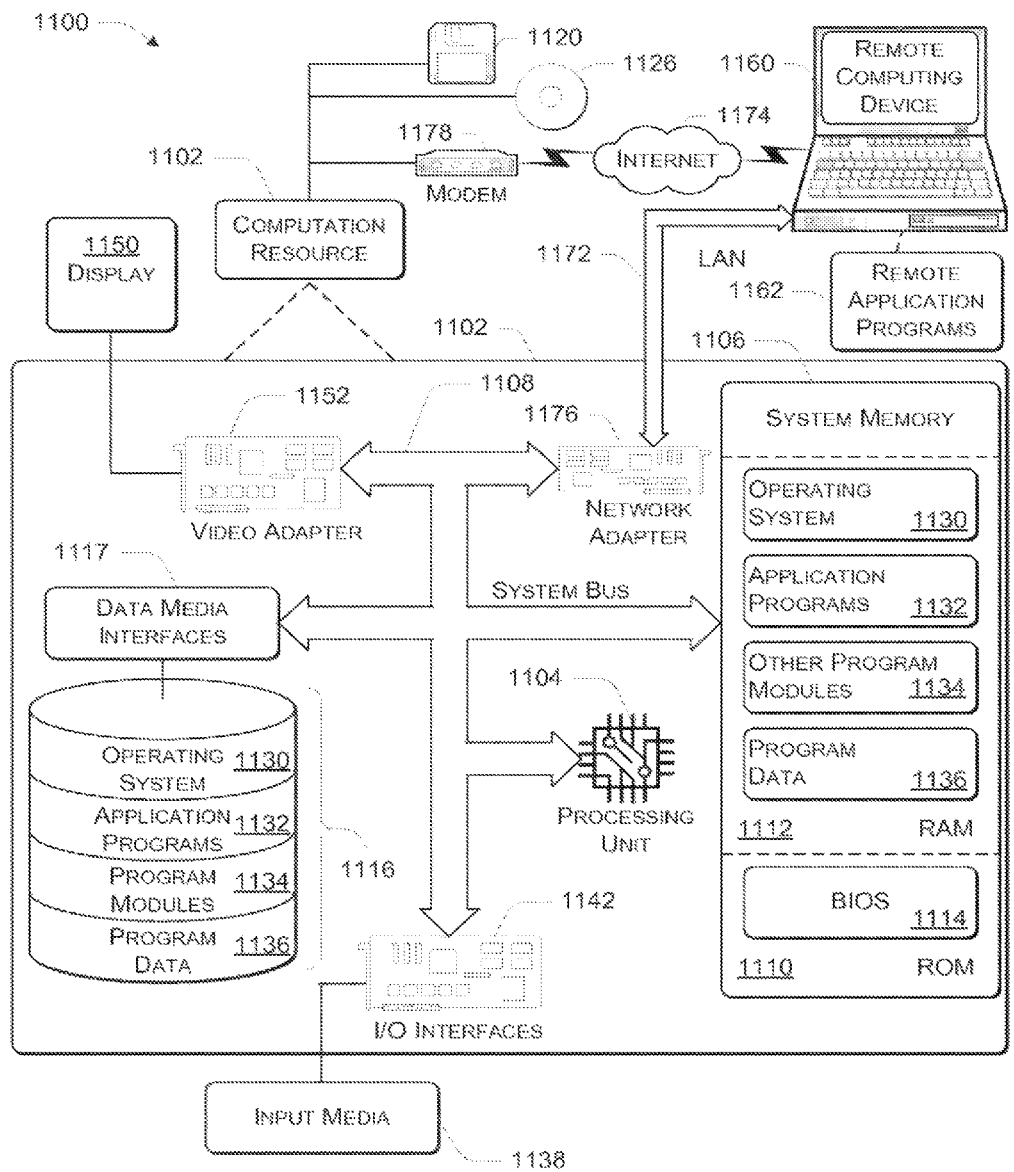
FIG. 11 depicts an embodiment of a general computer environment that may be used in connection with the system described in FIG. 3, portlet container in FIG. 4, the graphical user interfaces of FIGS. 5-10.

With reference now to FIG. 11, is an example of a general computer environment 1100, in accordance with an embodiment of the disclosed subject matter. The general computer environment 1100 includes a computation resource 1102 capable of implementing the processes described herein. It will be appreciated that other devices can alternatively used that include more components, or fewer components, than those illustrated in FIG. 11.

The illustrated operating environment 1100 is only one example of a suitable operating environment, and the example described with reference to FIG. 11 is not intended to suggest any limitation as to the scope of use or functionality of the embodiments of this disclosure. Other well-known computing systems, environments, and/or configurations can be suitable for implementation and/or application of the subject matter disclosed herein.

The computation resource 1102 includes one or more processors or processing units 1104, a system memory 1106, and a bus 1108 that couples various system components including the system memory 1106 to processor(s) 1104 and other elements in the environment 1100. The bus 1108 represents one or more of any of several types of bus structures, including a memory bus or, memory controller, a peripheral bus, an accelerated graphics port and a processor or local bus using any of a variety of bus architectures, and can be compatible with SCSI (small computer system interconnect), or other conventional bus architectures and protocols.

The system memory 1106 includes nonvolatile read-only memory (ROM) 1110 and random access memory (RAM) 1112, which can or cannot include volatile memory elements. A basic input/output system (BIOS) 1114, containing the elementary routines that help to transfer information between elements within computation resource 1102 and with external items, typically invoked into operating memory during start-up, is stored in ROM 1110.

The computation resource 1102 further can include anon-volatile read/write memory 1116, represented in FIG. 11 as a hard disk drive, coupled to bus 1108 via a data media interface 1117 (e.g., a SCSI, ATA, or other type of interface); a magnetic disk drive not shown) for reading from, and/or writing to, a removable magnetic disk 1120 and an optical disk drive (not shown) for reading from, and/or writing to, a removable optical disk 1126 such as a CD, DVD, or other optical media.

The non-volatile read/write memory 1116 and associated computer-readable media provide nonvolatile storage of computer-readable instructions, data structures, program modules and other data for the computation resource 1102. Although the exemplary environment 1100 is described herein as employing a non-volatile read/write memory 1116, a removable magnetic disk 1120 and a removable optical disk 1126, it will be appreciated by those skilled in the art that other types of computer-readable media which can store data that is accessible by a computer, such as magnetic cassettes, FLASH memory cards, random access memories (RAMs), read only memories (ROM), and the like, can also be used in the exemplary operating environment.

A number of program modules can be stored via the non-volatile read/write memory 1116, magnetic disk 1120, optical disk 1126, ROM 1110, or RAM 1112, including an operating system 1130, one or more application programs 1132, other program modules 1134 and program data 1136. Examples of computer operating systems conventionally employed include the LINUX® operating system, and others, for example, providing capability for supporting application programs 1132 using, for example, code modules written in the C++® computer programming language.

A user can enter commands and information into computation resource 1102 through input devices such as input media 1138 (e.g., keyboard/keypad, tactile input or pointing device, mouse, foot-operated switching apparatus, joystick, touchscreen or touchpad, microphone, antenna etc.). Such input devices 1138 are coupled to the processing unit 1104 through a conventional input/output interface 1142 that is, in turn, coupled to the system bus. A monitor 1150 or other type of display device is also coupled to the system bus 1108 via an interface, such as a video adapter 1152.

The computation resource 1102 can include capability for operating in a networked environment using logical connections to one or more remote computers, such as a remote computer 1160. The remote computer 1160 can be a personal computer, a server, a router, a network PC, a peer device or other common network node, and typically includes many or all of the elements described above relative to the computation resource 1102. In a networked environment, program modules depicted relative to the computation resource 1102, or portions thereof, can be stored in a remote memory storage device such as can be associated with the remote computer 1160. By way of example, remote application programs 1162 reside on a memory device of the remote computer 1160. The logical connections represented in FIG. 11 can include interface capabilities, e.g., such as a storage area network (SAN, not illustrated in FIG. 11), local area network (LAN) 1172 and/or a wide area network (WAN) 1174, but can also include other networks.

Such networking environments are commonplace in modern computer systems, and in association with intranets and the Internet. In certain embodiments, the computation resource 1102 executes an Internet Web browser program (which can optionally be integrated into the operating system 1130), such as the "Internet Explorer®" Web browser manufactured and distributed by the Microsoft Corporation of Redmond, Wash.

When used in a LAN-coupled environment, the computation resource 1102 communicates with or through the local area network 1172 via a network interface or adapter 1176. When used in a WAN-coupled environment, the computation resource 1102 typically includes interfaces, such as a modem 1178, or other apparatus, for establishing communications with or through the WAN 1174, such as the Internet. The modem 1178, which can be internal or external, is coupled to the system bus 1108 via a serial port interface.

In a networked environment, program modules depicted relative to the computation resource 1102, or portions thereof, can be stored in remote memory apparatus. It will be appreciated that the network connections shown are exemplary, and other means of establishing a communications link between various computer systems and elements can be used.

A user of a computer can operate in a networked environment 1400 using logical connections to one or more remote computers, such as a remote computer 1160, which can be a personal computer, a server, a router, a network PC, a peer device or other common network node. Typically, a remote computer 1160 includes many or all of the elements described above relative to the computer 1100 of FIG. 11.

The computation resource 1102 typically includes at least some form of computer-readable media. Computer-readable media can be any available media that can be accessed by the computation resource 1102. By way of example, and not limitation, computer-readable media can comprise computer storage media and communication media.

Computer storage media include volatile and nonvolatile, removable and non-removable media, implemented in any method or technology for storage of information, such as computer-readable instructions, data structures, program modules or other data. The term "computer storage media" includes, but is not limited to, RAM, ROM, EEPROM, FLASH memory or other memory technology, CD, DVD, or other optical storage, magnetic cassettes, magnetic tape, magnetic disk storage or other magnetic storage devices, or any other media which can be used to store computer-intelligible information and which can be accessed by the computation resource 1102.

Communication media typically embodies computer-readable instructions, data structures, program modules or other data, represented via, and determinable from, a modulated data signal, such as a carrier wave or other transport mechanism, and includes any information delivery media. The term "modulated data signal" means a signal that has one or more of its characteristics set or changed in such a manner as to encode information in the signal in a fashion amenable to computer interpretation.

By way of example, and not limitation, communication media include wired media, such as wired network or direct-wired connections, and wireless media, such as acoustic, RF, infrared and other wireless media. The scope of the term computer-readable media includes combinations of any of the above.

We claim:

1. A method, in a data processing system, for retrieving and displaying information associated with deployable web archives, the method comprising:

for a set of deployable web archives, retrieving, by a processor, information regarding a set of bookmarks of the set of deployable web archives created by a set of users, wherein each bookmark in the set of bookmarks includes deployment and runtime information of current and prior invocations of the deployable web archive with which the bookmark is associated, at least one external specified tag describing the deployable web archive specified by a user in the set of users that created the bookmark, and reference/link/access information to the deployable web archive;

displaying, in a display of the data processing system, each of the set of deployable web archives; and for each of the set of deployable web archives:
displaying, in the display, a total number of users that have bookmarked the deployable web archive;
displaying, in the display, a list of external specified tags used by the users to reference the deployable web archive; and
for each or the set of deployable web archives, displaying, in the display, a set of statistics regarding the bookmarking of the deployable web archive, wherein the set of statistics comprises: an average refresh rate of an executable web component associated with the deployable web archive, an overall rating of the deployable web archive based art user-given ratings associated with the deployable web archive, a number of users in the set of users who have the deployable web archive, but not deployed the executable web component associated with the deployable web archive, and a number of users in the set of users who have bookmarked the deployable web archive and have deployed the executable web component associated with the deployable web archive.

2. The method of claim 1, further comprising:
registering, by the processor, each bookmark with an entry for the deployable web archive, the deployable web archive being managed by a social bookmarking service.

3. The method of claim 1, wherein displaying each of the set of deployable web archives further comprises;
organizing the set of deployable web archives by at least two groups, wherein each group in the at least two groups comprises a subset of users from the set of users.

4. The method of claim 1, wherein displaying each of the set of deployable web archives further comprises:
organizing the set of deployable web archives by popularity, wherein the popularity is based on a number of times each deployable web archive is bookmarked.

5. The method of claim 1, wherein displaying each of the set of deployable web archives further comprises:
organizing the set of deployable web archives by user in the set of users.

6. The method of claim 5, wherein displaying each of the set of deployable web organized by user in the set of users further comprises:
displaying, in the display, a user-given rating associated with the deployable web archive, a date/timestamp of a last time the user refreshed an executable web component associated with the deployable web archive, an indication of whether the user has bookmarked the deployable web archive but not deployed the executable web component associated with the deployable web archive, and an indication of whether the user has bookmarked the deployable web archive and deployed the executable web component associated with the deployable web archive.

7. A computer program product for retrieving and displaying information associated with deployable web archives, the computer program product comprising:
a computer readable storage medium having computer usable program code stored thereon, the computer usable program code when executed on a computing device, causes the computing device to;
for a set of deployable web archives, retrieve information regarding a set of bookmarks of a set of deployable web archives created by a set of users, wherein each bookmark in the set of bookmarks includes deployment and runtime information of current and prior invocations of the deployable web archive with which the bookmark is associated, at least one external specified tag describing the deployable web archive specified by a user in the set of users that created the bookmark, and reference/link/access information to the deployable web archive; and
display each of the set of deployable web archives; and
for each of the set of deployable web archives:
 display a total number of users that have bookmarked deployable web archive;
 display a list of external specified tags-used by the users to reference the deployable web archive; and
 for each of the set of deployable web archives, display a set of statistics regarding the bookmarking of the deployable web archive, wherein the set of statistics comprises: an average refresh rate of an executable web component associated with the deployable web archive, an overall rating of the deployable web archive based on user-given ratings associated with the deployable web archive, a number of users in the set of users who have bookmarked the deployable web archive but not deployed the executable web component associated with the deployable web archive, and a number of users in the set of users who have bookmarked the deployable web archive and have deployed the executable web component associated with the deployable web archive.

8. The computer program product of claim 7, wherein the computer usable program code further causes the computing device to;
register each bookmark with an entry for the deployable web archive, the deployable web archive being managed by a social bookmarking service.

9. The computer program product of claim 7, wherein the computer usable program code to display each of the set of deployable web archives further causes the computing device to:
organize the set of deployable web archives by at least two groups, wherein each group in the at least two groups comprises a subset of users from the set of users.

10. The computer program product of claim 7, wherein the computer usable program code to display each of the set of deployable web archives further causes the computing device to:
organize the set of deployable web archives by popularity, wherein the popularity is based on a number of times each deployable web archive is bookmarked.

11. The computer program product of claim 7, wherein the computer usable program code to display each of the set of deployable web archives further causes the computing device to:
organize the set of deployable web archives by user in the set of users.

12. The computer program product of claim 11, wherein the computer usable program code to display each of the set of deployable web organized by user in the set of users further causes the computing device to:
display a user-given rating associated with the deployable web archive, a date/timestamp of a last time the user refreshed art executable web component associated with the deployable web archive, an indication of whether the user has bookmarked the deployable web archive but not deployed the executable web component associated with the deployable web archive, and an indication of whether the user has bookmarked the deployable web archive and deployed the executable web component associated with the deployable web archive.

13. A system comprising:
a processor; and
a memory coupled to the processor, wherein memory comprises instructions which, when executed by the processor, cause the processor to
for a set of deployable web archives, retrieve information regarding a set of bookmarks of the set of deployable web archives created by a set of users, wherein each bookmark in the set of bookmarks includes deployment and runtime information of current and prior invocations of the deployable web archive with which the bookmark is associated, at least one external specified tag describing the deployable web archive specified by a user in the set of users that created the bookmark, and reference/link/access information to the deployable web archive:
display each of the set of deployable web archives; and
for each of the set of deployable web archives:
 display a total number of users that have bookmarked the deployable web, display a list of external specified tags used by the users to reference the deployable web archive; and
 for each of the set of deployable web archives, display a set of statistics regarding the bookmarking of the deployable web archive, wherein the set of statistics comprises: an average refresh rate of an executable web component associated with the deployable web archive, an overall rating of the deployable web archive based on user-given ratings associated with the deployable web archive, a number of users in the set of users who have bookmarked the deployable web archive but not deployed the executable web component associated with the deployable web archive, and a number of users in the set of users who have bookmarked the deployable web archive and have deployed the executable web component associated with the deployable web archive.

14. The system of claim 13, wherein the instructions further cause the processor to:
register each bookmark with an entry for the deployable web archive, the deployable web archive being managed by a social bookmarking service.

15. The system of claim 13, wherein the instructions to display each of the set of deployable web archives further cause the processor to
organize the et of deployable web archives by at least two groups, wherein each group in the at least two groups comprises a subset of users from the set of users.

16. The system of claim 13, wherein the instructions to display each of the set of deployable web archives further cause the processor to:
organize the set of deployable web archives by popularity, wherein the popularity is based on a number of times each deployable web archive is bookmarked.

17. The system of claim 13, wherein the instructions to display each of the set of deployable web archives further cause the processor to:
organize the set of deployable web archives by user in the set of users.

18. The system of claim 17, wherein the instructions to display each of the set of deployable web organized by user in the set of users further cause the processor to:

display a user-given rating associated with the deployable web archive, a date/timestamp of a last time the user refreshed an executable web component associated with the deployable web archive, an indication of whether the user has bookmarked the deployable web archive but not deployed the executable web component associated with the deployable web archive, and an indication of whether the user has bookmarked the deployable web archive and deployed the executable web component associated with the deployable web archive.

* * * * *